US010705587B2

(12) United States Patent
Greenhalgh et al.

(10) Patent No.: US 10,705,587 B2
(45) Date of Patent: Jul. 7, 2020

(54) MODE SWITCHING IN DEPENDENCE UPON A NUMBER OF ACTIVE THREADS

(71) Applicant: ARM LIMITED, Cambridge (GB)

(72) Inventors: Peter Richard Greenhalgh, Cambridge (GB); Simon John Craske, Cambridge (GB); Ian Michael Caulfield, Cambridge (GB); Max John Batley, Cottenham (GB); Allan John Skillman, Kettering (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 777 days.

(21) Appl. No.: 15/133,329

(22) Filed: Apr. 20, 2016

(65) Prior Publication Data

US 2016/0357565 A1 Dec. 8, 2016

(30) Foreign Application Priority Data

Jun. 5, 2015 (GB) .................................. 1509745.4

(51) Int. Cl.
*G06F 9/38* (2018.01)
*G06F 1/3206* (2019.01)
(Continued)

(52) U.S. Cl.
CPC .......... *G06F 1/3206* (2013.01); *G06F 1/3237* (2013.01); *G06F 1/3243* (2013.01);
(Continued)

(58) Field of Classification Search
CPC .. G06F 9/30189; G06F 9/3848; G06F 9/3851; G06F 1/3206; G06F 1/3237;
(Continued)

(56) References Cited

U.S. PATENT DOCUMENTS

| 7,100,060 B2 * | 8/2006 | Cai ......................... G06F 1/206 713/320 |
| 7,155,600 B2 * | 12/2006 | Burky ..................... G06F 9/485 712/229 |

(Continued)

FOREIGN PATENT DOCUMENTS

WO   WO 2014/108747   7/2014

OTHER PUBLICATIONS

Khubaib et al., "MorphCore: An Energy-Efficient Microarchitecture for High Performance ILP and High Throughput TLP," 45th Annual IEEE/ACM International Symposium on Microarchitecture, Dec. 2012, pp. 305-316. (Year: 2012).*

(Continued)

*Primary Examiner* — Michael J Metzger
(74) *Attorney, Agent, or Firm* — Nixon & Vanderhye, P.C.

(57) ABSTRACT

Apparatus for processing data is provided with fetch circuitry for fetching program instructions for execution from one or more active threads of instructions having respective program counter values. Pipeline circuitry has a first operating mode and a second operating mode. Mode switching circuitry switches the pipeline circuitry, between the first operating mode and the second operating mode in dependence upon a number of active threads of program instructions having program instructions available to be executed. The first operating mode has a lower average energy consumption per instruction executed than the second operating mode and the second operating mode has a higher average rate of instruction execution for a single thread than the first operating mode. The first operating mode may utilise a barrel processing pipeline to perform interleaved multiple thread processing. The second operating mode may utilise (Continued)

an out-of-order processing pipeline for performing out-of-order processing.

17 Claims, 4 Drawing Sheets

(51) Int. Cl.
  *G06F 1/3287* (2019.01)
  *G06F 9/30* (2018.01)
  *G06F 1/3234* (2019.01)
  *G06F 1/3237* (2019.01)
(52) U.S. Cl.
  CPC ........ *G06F 1/3287* (2013.01); *G06F 9/30189* (2013.01); *G06F 9/3848* (2013.01); *G06F 9/3851* (2013.01); *Y02D 10/128* (2018.01); *Y02D 10/152* (2018.01); *Y02D 10/171* (2018.01)
(58) Field of Classification Search
  CPC .. G06F 1/3243; Y02D 10/171; Y02D 10/128; Y02D 10/152
  USPC .......................................................... 712/229
  See application file for complete search history.

(56) References Cited

U.S. PATENT DOCUMENTS

| | | | | |
|---|---|---|---|---|
| 7,398,374 | B2* | 7/2008 | DeLano | G06F 9/3828 712/206 |
| 7,584,346 | B1* | 9/2009 | Chaudhry | G06F 9/3802 711/156 |
| 8,347,068 | B2* | 1/2013 | Eickemeyer | G06F 9/30145 712/217 |
| 9,804,847 | B2* | 10/2017 | Bradbury | G06F 9/3013 |
| 9,891,964 | B2* | 2/2018 | Araujo | G06F 9/542 |
| 2003/0033509 | A1* | 2/2003 | Leibholz | G06F 9/3012 712/228 |
| 2004/0181654 | A1* | 9/2004 | Chen | G06F 9/30181 712/239 |
| 2005/0066154 | A1* | 3/2005 | Chung | G06F 9/3848 712/239 |
| 2008/0229077 | A1 | 9/2008 | Sathaye | |
| 2010/0306516 | A1* | 12/2010 | Suzuki | G06F 1/3203 712/240 |
| 2012/0221796 | A1 | 8/2012 | Tran | |
| 2013/0198490 | A1* | 8/2013 | Tran | G06F 9/3804 712/205 |
| 2014/0281402 | A1 | 9/2014 | Comparan et al. | |
| 2015/0095918 | A1* | 4/2015 | Alameldeen | G06F 12/0811 718/104 |
| 2015/0121048 | A1* | 4/2015 | Lukefahr | G06F 9/30189 712/229 |
| 2015/0301832 | A1* | 10/2015 | Zhang | G06F 9/3861 712/207 |
| 2015/0370568 | A1* | 12/2015 | Robertson | G06F 9/30189 712/43 |

OTHER PUBLICATIONS

Hennessy et al., "Computer Architecture a Quantitative Approach," 5th Ed., 2012, pp. 223-226. (Year: 2012).*
Claim 13 and 14 are rejected under 35 U.S.C. 103 as being unpatentable over Khubaib, and further in view of Grochowski et al., "Best of Both Latency and Throughput," Proceedings of the IEEE International Conference on Computer (Year: 2004).*
Parikh et al., "Power issues related to branch prediction", Proceedings Eighth International Symposium on High-Performance Computer Architecture, 2002. (Year: 2002).*
Combined Search and Examination Report for GB1509745.4 dated Dec. 21, 2015, six pages.
Examination Report dated Aug. 14, 2018 in GB Application No. 1509745.4, 4 pages.

* cited by examiner

MODE SWITCHING IN DEPENDENCE UPON A NUMBER OF ACTIVE THREADS

This application claims priority to GB Patent Application No. 1509745.4 filed 5 Jun. 2015, the entire content of which is hereby incorporated by reference.

BACKGROUND

Field

This disclosure relates to the field of data processing systems. More particularly, this disclosure is to data processing systems supporting executing of multiple active threads of program instructions having respective program counter values.

Description

It is known to provide data processing systems that support multiple active threads of program instructions having respective program counter values. Such parallelism may help to increase instruction throughput by reducing the impact of dependencies within threads.

SUMMARY

Viewed from one aspect the present disclosure provides apparatus for processing data comprising:

fetch circuitry to fetch program instructions for execution from one or more active threads of program instructions having respective program counter values;

pipeline circuitry to execute program instructions fetched by said fetch circuitry, said pipeline circuitry having a first operating mode and a second operating mode; and mode switching circuitry to switch said pipeline circuitry between said first operating mode and said second operating mode in dependence upon a number of active threads of program instructions having program instructions fetched by said fetch circuitry and available to be executed by said pipeline circuitry, wherein said first operating mode has a lower average energy consumption per instruction executed than said second operating mode, said second operating mode has a higher average rate of instruction execution for a single thread than said first operating mode, and at least one portion of said pipeline circuitry is disabled in one of said first operating mode and said second operating mode and enabled in a different one of said first operating mode and said second operating mode.

Viewed from another aspect the present disclosure provides apparatus for processing data comprising:

fetch means for fetching program instructions for execution from one or more active threads of program instructions having respective program counter values;

pipeline means for executing program instructions fetched by said fetch circuitry, said pipeline means having a first operating mode and a second operating mode; and mode switching means for switching said pipeline means between said first operating mode and said second operating mode in dependence upon a number of active threads of program instructions having program instructions fetched by said fetch means and available to be executed by said pipeline means, wherein said first operating mode has a lower average energy consumption per instruction executed than said second operating mode, said second operating mode has a higher average rate of instruction execution for a single thread than said first operating mode, and at least one portion of said pipeline means is disabled in one of said first operating mode and said second operating mode and enabled in a different one of said first operating mode and said second operating mode.

Viewed from a further aspect the present disclosure provides a method of processing data comprising:

fetching program instructions for execution from one or more active threads of program instructions having respective program counter values;

executing program instructions fetched using a selectable one of a first operating mode and a second operating mode; and switching between said first operating mode and said second operating mode in dependence upon a number of active threads of program instructions having program instructions fetched and available to be executed, wherein said first operating mode has a lower average energy consumption per instruction executed than said second operating mode, said second operating mode has a higher average rate of instruction execution for a single thread than said first operating mode, and at least one portion of circuitry to execute said program instructions is disabled in one of said first operating mode and said second operating mode and enabled in a different one of said first operating mode and said second operating mode.

The above, and other objects, features and advantages of this disclosure will be apparent from the following detailed description of illustrative embodiments which is to be read in connection with the accompanying drawings.

EMBODIMENTS

Figure 1:
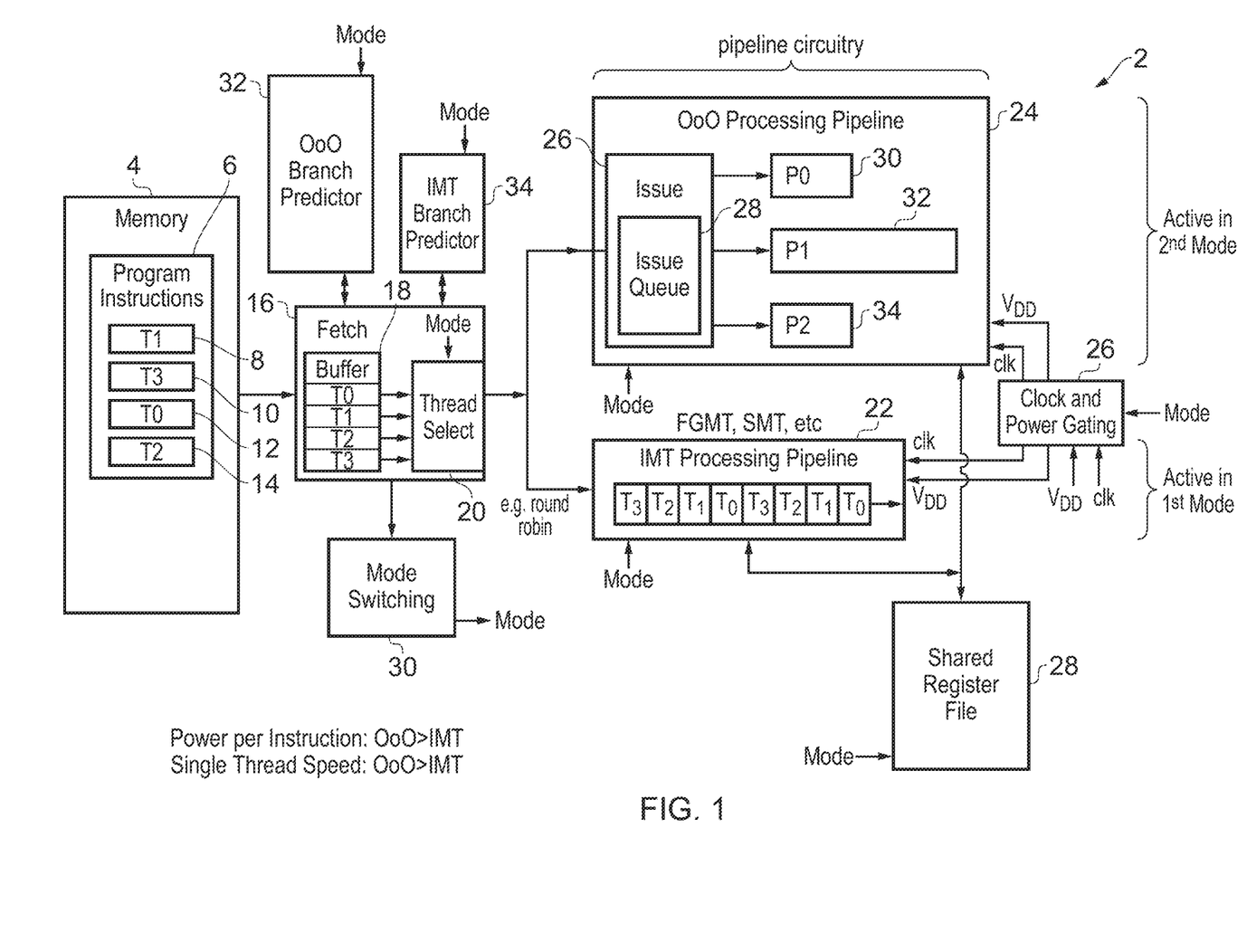
FIG. 1 schematically illustrates a data processing apparatus having an interleaved multi-threading processing pipeline active in a first operating mode and an out-of-order processing pipeline active in a second operating mode.

FIG. 1 schematically illustrates a data processing system 2 including a memory 4 storing program instructions 6 from multiple threads of program instructions 8, 10, 12, 14 stored at different memory address locations within the memory 4 and having different associated program counter (PC) values when those threads 8, 10, 12, 14 are executed. Fetch circuitry 16 serves to fetch program instructions to be executed from the memory 4 and store these within an instruction buffer 18. The instruction buffer 18 includes respective portions storing program instructions fetched from the different program threads 8, 10, 12, 14 following their respective program counter values. Thread selection circuitry 20 selects program instructions from the instruction buffer 18 and sends these to a respective one of an interleaved multiple thread (IMT) processing pipeline 22 and an out-of-order (OoO) processing pipeline 24. In other example embodiments the interleaved multiple thread processing pipeline 22 could instead be a fine grained multiple thread processing pipeline, a simultaneous multiple threaded processing pipeline, or similar. The interleaved multiple thread processing pipeline 22 can have a variety of different forms, such as, for example, a barrel processing pipeline in which program instructions from different threads are issued into the pipeline following a strict round robin selection algorithm. This type of operation is illustrated in FIG. 1 whereby the respective stages in the eight stage pipeline hold program instructions taken from four active threads in the sequence $T_0, T_1, T_2, T_3, T_0, T_1, T_2$ and $T_3$. It will be appreciated that the barrel processing pipeline illustrated in FIG. 1 is only one example of the interleaved multiple thread processing pipeline 22 which may be used and other forms of multi-threading may be used, such as fine-grained multi-threading, simultaneous multi-threading etc.

The out-of-order processing pipeline 24 includes an issue stage 26 which receives program instructions to be executed from the fetch circuitry 18 and stores these within an issue queue 28. The issue stage 26 operates in accordance with out-of-order processing techniques and issues the program instructions from the issue queue 28 into respective pipelines 30, 32, 34 for execution.

The interleaved multiple thread processing pipeline 22 has a relatively high energy efficiency and in particular, when it is fully utilised, has a lower average energy consumption per instruction executed than the out-of-order processing pipeline 24. The out-of-order processing pipeline 24 has a relatively high instruction throughput and in particular has a higher average rate of instruction execution for a single thread than the interleaved multiple thread processing pipeline 22.

The thread selection circuitry 20 when operating in the first mode of operation utilises round robin selection among the active threads 8, 10, 12, 14 and sends the accordingly interleaved instructions into the interleaved multiple thread processing pipeline 22. When the second operating mode is active, then the thread selection circuitry 20 selects instructions from the one or more threads having program instructions ready and sends these for execution to the out-of-order processing pipeline 24. In the first operating mode the out-of-order processing pipeline 24 is disabled/inactive and the interleaved multiple thread processing pipeline 22 is enabled/active. Clock and power gating circuitry 26 acts during the first operating mode to perform one or more of clock gating or powered domain control in respect of the out-of-order processing pipeline 24 to place this in a low power consumption state during the first operating mode. Some embodiments may provide a low power retention mode in which a lower power is supplied and state is retained but the circuitry is not active. Conversely, during the second operating mode the out-of-order processing pipeline 24 is enabled/active and the interleaved multiple thread processing pipeline 22 is disabled/inactive and the clock and power gating circuitry 26 serves to perform one or more of clock gating and power domain control in respect of the interleaved multiple thread processing pipeline 22 to place this into a low power consumption state.

The interleaved multiple thread processing pipeline 22 and the out-of-order processing pipeline 24 share a shared register file 28. When operating in the first operating mode, where the interleaved multiple threaded processing pipeline 22 may be a barrel processor, the shared register file 28 is configured to provide respective sets of registers for use by the different threads concurrently active within the IMT pipeline 22. When operating in the second operating mode, the shared register file 28 is configured in a different way to support register renaming and register allocation tracking in accordance with out-of order processing techniques used by the out-of-order processing pipeline 24.

Mode switching circuitry 30 serves to switch the data processing apparatus 2 between the first operating mode and the second operating mode. The mode switching circuitry 30 receives data from the fetch circuitry 16 indicating a number of active threads of program instructions having program instructions that have been fetched by the fetch circuitry 8 and are available to be executed by the pipeline circuitry 22, 24. The fetch circuitry 16 may seek to fetch program instructions from multiple program threads using their respective program counter values. However, individual threads within the multiple threads which are being fetched may, at a given point in time, not have program instructions which are available to be executed. As an example, a branch misprediction with respect to a given thread may stall that thread while the instructions which were incorrectly sent to the interleaved multiple threaded pipeline 22 following the mispredicted branch are flushed and the required instructions from the correct branch target are fetched from the memory 4. Examples of other reasons why an individual thread may stall include execution of a long latency memory access instruction or a long latency data processing instruction, such as a division instruction, a multiply accumulate instruction, a square root instruction etc. Another example reason why a given thread may not have instructions available for execution is the action of "fairness" mechanisms which at a different level control scheduling between threads to ensure that each thread receives a fair share of processing and is able to make forward progress in a manner commensurate with its associated quality-of-service requirements.

FIG. 1 also illustrates two possible branch predictors that may be enabled/disabled (active/inactive), namely an out-of-order branch predictor 32 and an interleaved multiple thread branch predictor 34. As the out-of-order processing pipeline 24 is typically used when fewer active threads are available, it will typically contain more "in flight" program instructions from a given processing thread at any one time and accordingly the consequences of a branch misprediction are more severe for the out-of-order processing pipeline 24 should such a misprediction occur. In particular, a typically greater number of partially processed program instructions may require flushing from the out-of-order processing pipeline 24 should a branch misprediction occur. In view of this, it may be appropriate to dedicate more resource to the out-of-order branch predictor 32 than is allocated to the interleaved multiple thread branch predictor 34. The circuit area and energy consumed by the out-of-order branch predictor 34 is justified in order to achieve more accurate branch prediction given that the penalty associated with branch misprediction for the out-of-order processing pipeline 24 is relatively high. Conversely, the interleaved multiple thread branch predictor 34 may be smaller, simpler and have a lower power consumption than the out-of-order branch prediction 32. The branch misprediction penalty associated with the interleaved multiple threaded processing pipeline 22 (e.g. barrel processor) is less severe and accordingly there is a different balance between the energy and area/cost associated with the interleaved multiple thread branch predictor 34 and the branch misprediction penalty associated with the interleaved multiple thread pipeline 22.

Figure 2:
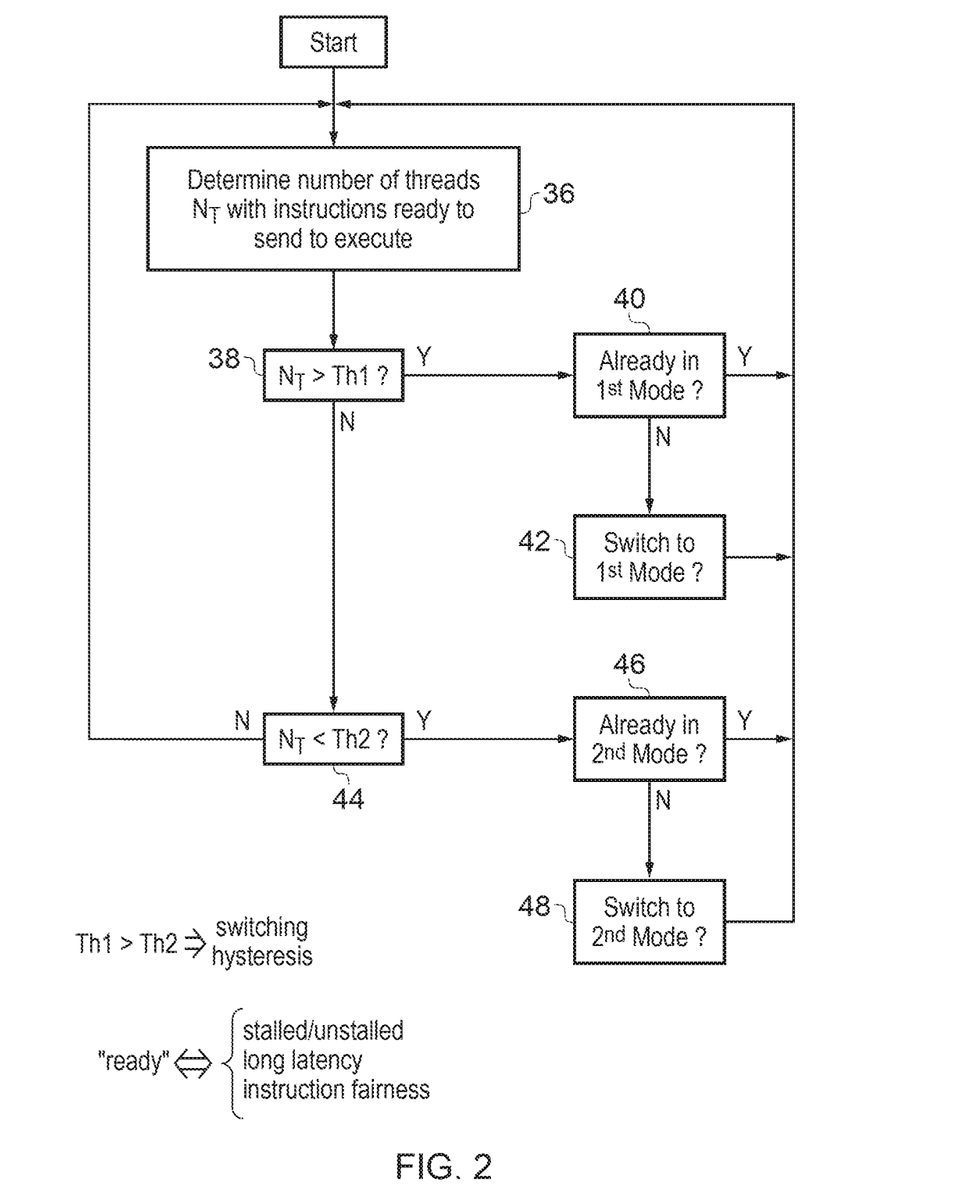
FIG. 2 is a flow diagram schematically illustrating switching between the first operating mode and the second operating mode in dependence upon a number of threads ready to send instructions to execute.

FIG. 2 is a flow diagram schematically illustrating the operation of the mode switching circuitry 30 in switching between the first operating mode and the second operating mode in dependence upon the number of active threads of program instructions having program instructions fetched by the fetch circuitry 16 and available to be executed by the pipeline circuitry 22, 24. In particular, at step 36 the mode switching circuitry 30 determines the current number of active threads $N_T$. Step 38 then determines whether this number of active threads $N_T$ is greater than a second-to-first threshold number (Th1). If the number of active threads is greater than this second-to-first threshold number, then step 40 determines whether the data processing apparatus 2 is already in the first operating mode. If the data processing apparatus 2 is not already in the first operating mode, then step 42 serves to switch the data processing apparatus 2 from the second operating mode to the first operating mode.

If the determination at step 38 is that the number of active threads is not greater than the second-to-first threshold number, then processing proceeds to step 44 where a determination is made as to whether or not the number of active threads is fewer than a first-to-second threshold number (Th2). If the determination at step 44 is that the number of active threads is fewer than the first-to-second threshold number, then step 46 determines whether the data processing apparatus 2 is already in the second operating mode. If the data processing apparatus 2 is not already in the second operating mode, then step 48 serves to switch the data processing apparatus 2 from the first operating mode to the second operating mode.

It will be appreciated that the first-to-second threshold number and the second-to-first threshold number may be different in order to provide hysteresis in the switching between the first operating mode and the second operating mode. In particular, the first threshold number (Th1) may be greater than the first-to-second threshold number (Th2). As one example, the mode switching circuitry 30 may switch from the second mode of operation to the first mode of operation when more than three active threads of program instructions are detected. Conversely, the mode switching circuitry 30 may switch from the first mode of operation to the second mode of operation when fewer than two active threads of program instructions are detected. It will be appreciated that other thresholds are also possible depending upon the desired switching characteristics and the number of active threads of program instructions typically supported. It will be noted that the out-of-order processing pipeline 24 which is active in the second operating mode may execute a single thread of program instructions or multiple threads (relatively few) of program instructions in accordance with simultaneous multi-threaded processing. The mode switching circuitry 30 may, for example, also impose additional control upon the switching between modes, such as imposing a minimum period during which the number of active threads being processed indicates a switch is required before that switch is actually made in order to reduce the likelihood of switching between the operating mode too rapidly given that there will typically be a cost in terms of processing throughput and energy for performing the switch between operating modes.

Figure 3:
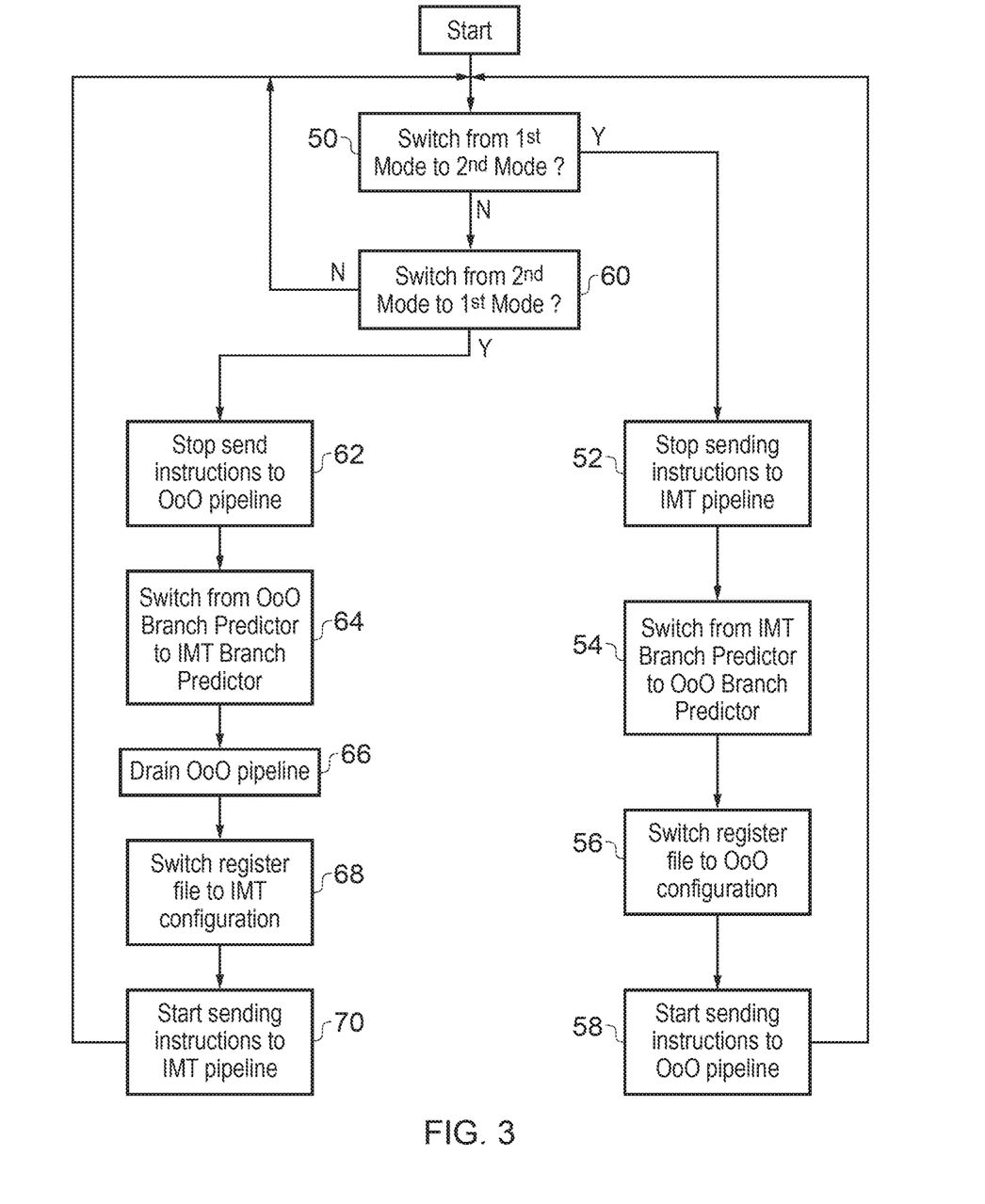
FIG. 3 is a flow diagram schematically illustrating switching from the first operating mode to the second operating mode and switching from the second operating mode to the first operating mode in the case of the example of FIG. 1.

FIG. 3 schematically illustrates operation of the data processing apparatus 2 when switching from the first operating mode to the second operating mode and when switching from the second operating mode to the first operating mode. At step 50 a determination is made as to whether or not it is desired to switch from the first operating mode to the second operating mode. If such a switch is desired, then step 52 serves to control the thread selecting circuitry 20 to stop sending program instructions to the interleaved multiple thread processing pipeline 22. Step 54 switches the interleaved multiple thread branch predictor 34 to an inactive state and the out-of order branch predictor 32 to an active state. Step 56 switches the shared register file 28 from a configuration associated with the interleaved multiple thread processing pipeline 22 to a configuration associated with the out-of-order processing pipeline 24. Step 58 controls the thread selection circuitry 20 to start sending program instructions from the instruction buffer 18 to the out-of-order processing pipeline 24.

If the determination at step 50 is that no switch is required from the first operating mode to the second operating mode, then step 60 serves to determine whether a switch from the second operating mode to the first operating mode is required. If a switch from the second operating mode to the first operating mode is required, then step 62 serves to control the thread selection circuitry 20 to stop sending instructions to the out-of-order processing pipeline 24. Step 64 switches the out-of-order branch predictor 32 into an inactive state and the interleaved multiple thread branch predictor 34 to an active state. Step 66 waits for the pending instructions within the out-of-order processing pipeline 24 to drain and complete. Step 68 switches the shared register file 28 from the configuration associated with the out-of-order processing pipeline 24 into the configuration associated with the interleaved multiple thread processing pipeline 22. Step 70 controls the thread selection circuitry 20 to start sending instructions to the interleaved multiple threaded processing pipeline 22.

Figure 4:
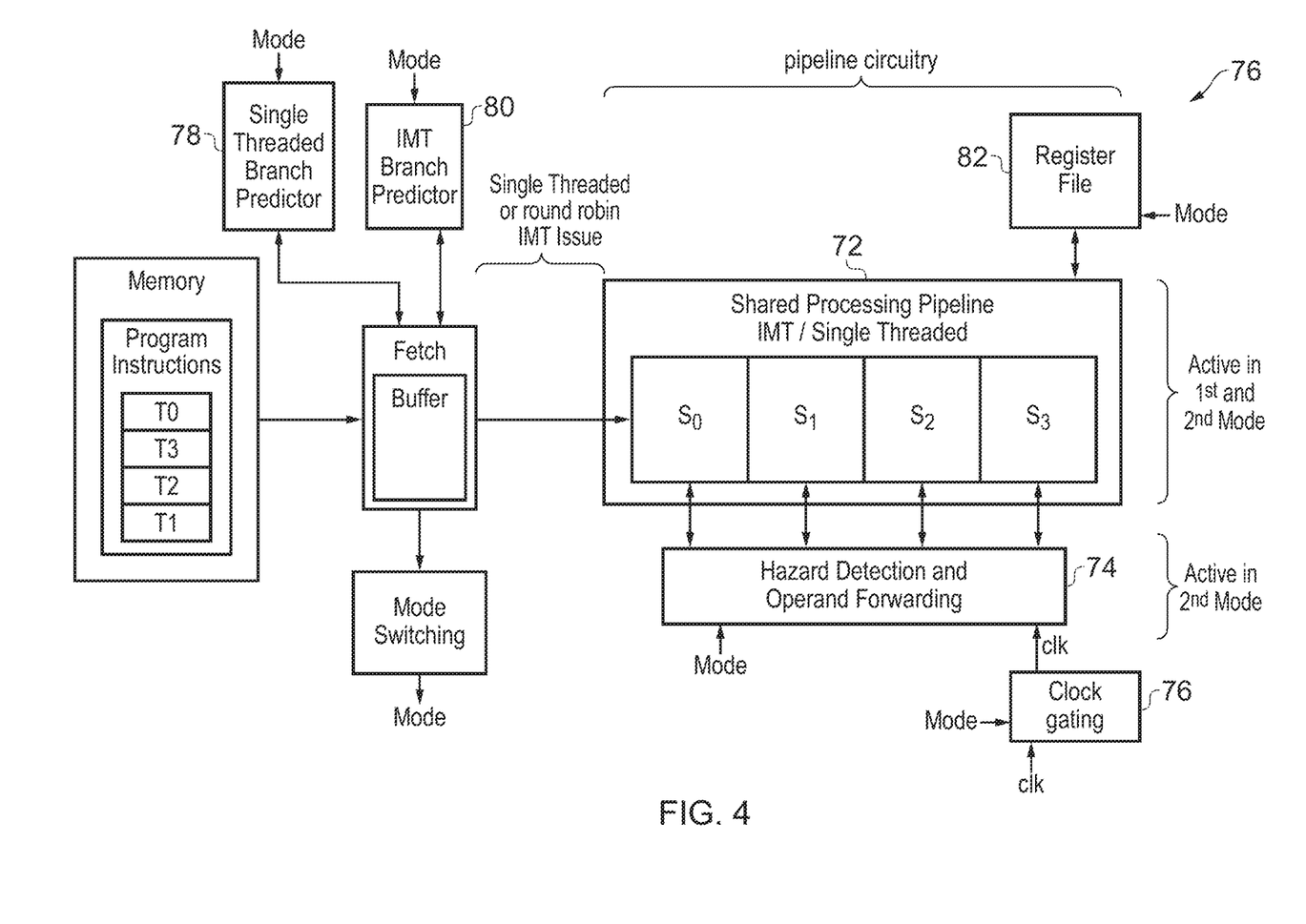
FIG. 4 schematically illustrates an example embodiment having a processing pipeline which can operate in a first operating mode without hazard detection and operand forwarding and in a second operating mode with hazard detection and operand forwarding.

FIG. 4 schematically illustrates a further example embodiment. In this example embodiment, the pipeline circuitry includes shared processing pipeline circuitry 72 which is capable of operating to execute instructions in accordance with interleaved multiple threaded operation or single threaded operation. Hazard detection and operand forwarding circuitry 74 is enabled/active when the data processing apparatus 76 of FIG. 2 is in a second operating mode. The second operating mode corresponds to single threaded operation. When a single thread (or less than a threshold number) is being processed by the shared processing pipeline 72, then hazards between instructions at different pipeline stages are more likely to arise and accordingly the benefits of having the hazard detection and operand forwarding circuitry 74 active outweigh the energy that it consumes. Conversely, when a larger number (more than a threshold number, possibly different) of active threads of program instructions are being issued into the shared processing pipeline 72 in accordance with, for example, a round robin issue policy, then the number of types of hazards that can arise are fewer and accordingly the hazard detection and operand forwarding circuitry 74 associated with those types of hazard may be placed into an inactive state by clock gating circuitry 76. The shared processing pipeline circuitry 72 is active both in the first operating mode and in the second operating mode. The hazard detection and operand forwarding circuitry 74 is disabled/inactive in the first operating mode and enabled/active in the second operating mode.

Multiple branch predictors may be provided, namely a single (few) thread branch predictor 78 and an interleaved multiple thread branch predictor 80. As the penalty associated with branch misprediction in the case of single threaded operation is higher than that associated with branch misprediction for interleaved multiple threaded operation (the penalty for a misprediction applies to a single thread and so if there are multiple threads, then the penalty for a single misprediction is smaller in the context of the overall throughput), the energy cost associated with a larger and more complex single threaded branch predictor 78 is justified when the data processing apparatus 76 is in the second operating mode. When operating in the first operating mode, the penalty associated with branch misprediction is less and accordingly a simpler and lower energy branch predictor in the form of the interleaved multiple threaded branch predictor 80 may be used during the first operating mode.

The register file 82 may be switched between a mode in which multiple banks of registers are provided for respective threads being processed by the shared processing pipeline 72 when operating in the second operating mode. When in the first operating mode in which a single thread is processed, then the register file 82 may provide a single bank of registers for use by that single thread.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

We claim:

1. Apparatus for processing data, comprising:
    fetch circuitry to fetch program instructions for execution from one or more active threads of program instructions having respective program counter values;
    pipeline circuitry to execute program instructions fetched by said fetch circuitry, said pipeline circuitry having a first operating mode and a second operating mode; and
    mode switching circuitry to switch said pipeline circuitry between said first operating mode and said second operating mode in dependence upon a number of active threads of program instructions having program instructions fetched by said fetch circuitry and available to be executed by said pipeline circuitry;
    branch prediction circuitry to predict branch instruction outcomes, wherein said branch prediction circuitry has a first branch prediction mode corresponding to said first operating mode of said pipeline circuitry and a second branch prediction mode corresponding to said second operating mode of said pipeline circuitry, said first branch prediction mode consuming less power and providing less accurate branch predictions than said second branch prediction mode which consumes more power and provides more accurate branch predictions, wherein:
    said first operating mode has a lower average energy consumption per instruction executed than said second operating mode, said second operating mode has a higher average rate of instruction execution for a single thread than said first operating mode, and at least one portion of said pipeline circuitry is disabled in one of said first operating mode and said second operating mode and enabled in a different one of said first operating mode and said second operating mode;
    said pipeline circuitry comprises out-of-order processing circuitry supporting out-of-order program instruction execution, and
    operation of said out-of-order processing circuitry corresponding to said second operating mode and to said second branch prediction mode.

2. Apparatus as claimed in claim 1, wherein said out-of-order processing circuitry is an out-of-order processing pipeline to execute program instructions fetched by said fetch circuitry during said second mode of operation.

3. Apparatus as claimed in claim 1, wherein said pipeline circuitry comprises hazard detection and operand forwarding circuitry supporting hazard detection and operand forwarding between pipeline stages during program instruction execution, enabled use of said hazard detection and operand forward circuitry corresponding to said second operating mode.

4. Apparatus as claimed in claim 3, wherein said hazard detection and operand forwarding circuitry is a hazard detection and operand forwarding processing pipeline to execute program instructions fetched by said fetch circuitry during said second mode of operation.

5. Apparatus as claimed in claim 1, wherein said pipeline circuitry comprises interleaved multithreaded processing circuitry supporting interleaved multithreaded processing of a plurality of threads of program instructions whereby one or more program instructions from respective ones of a plurality of threads of program instructions are concurrently executed at respective different stages of a plurality of processing stages within said multithreaded processing circuitry, enabled use of said interleaved multithreaded processing circuitry corresponding to said first mode of operation.

6. Apparatus as claimed in claim 5, wherein respective ones of said plurality of different processing stages operate independently of data held in other of said plurality of different processing stages.

7. Apparatus as claimed in claim 5, wherein said interleaved multithreaded processing circuitry uses strict round robin selection to select program instructions from said plurality of threads of program instructions.

8. Apparatus as claimed in claim 5, wherein said interleaved multithreaded processing circuitry is an interleaved multithreaded processing pipeline to execute program instructions fetched by said fetch circuitry during said first mode of operation.

9. Apparatus as claimed in claim 1, wherein said pipeline circuitry comprises shared processing pipeline circuitry used during both said first operating mode and said second operating mode to execute program instructions fetched by said fetch circuitry.

10. Apparatus as claimed in claim 1, wherein said at least one portion of said pipeline circuitry disabled during a respective one of said first operating mode and said second operating mode are switched from a high power consumption state to a low power consumption state.

11. Apparatus as claimed in claim 10, wherein said lower power consumption state uses one or more of:
    clock gating;
    retention modes; and
    power gating.

12. Apparatus as claimed in claim 1, wherein when said pipeline circuitry operates in said second operating mode and a branch misprediction occurs a greater number of partially processed program instructions are flushed from said pipeline circuitry than when said pipeline circuitry operates in said first operating mode and a branch misprediction occurs.

13. Apparatus as claimed in claim 1, wherein said mode switching circuitry switches from operation of said pipeline circuitry from said first mode to said second mode when there are fewer than a first-to-second threshold number of active threads of program instructions.

14. Apparatus as claimed in claim 1, wherein said mode switching circuitry switches from operation of said pipeline circuitry from said second mode to said first mode when there are more than a second-to-first threshold number of active threads of program instructions.

15. Apparatus as claimed in claim 1, comprising a shared register file used in both said first operating mode and said second operating mode.

16. Apparatus for processing data comprising:
means for fetching program instructions for execution from one or more active threads of program instructions having respective program counter values;
means for executing program instructions fetched by said means for fetching, said means for executing having a first operating mode and a second operating mode; and
means for switching said means for executing between said first operating mode and said second operating mode in dependence upon a number of active threads of program instructions having program instructions fetched by said means for fetching and available to be executed by said means for executing,
means for predicting branch instruction outcomes, wherein said means for predicting has a first branch prediction mode corresponding to said first operating mode of said means for executing and a second branch prediction mode corresponding to said second operating mode of said means for executing, said first branch prediction mode consuming less power and providing less accurate branch predictions than said second branch prediction mode which consumes more power and provides more accurate branch predictions, wherein:
said first operating mode has a lower average energy consumption per instruction executed than said second operating mode, said second operating mode has a higher average rate of instruction execution for a single thread than said first operating mode, and at least one portion of said means for executing is disabled in one of said first operating mode and said second operating mode and enabled in a different one of said first operating mode and said second operating mode;
said means for executing comprises out-of-order processing circuitry supporting out-of-order program instruction execution, and operation of said out-of-order processing circuitry corresponding to said second operating mode and said second branch prediction mode.

17. A method of processing data, comprising:
fetching program instructions for execution from one or more active threads of program instructions having respective program counter values;
executing program instructions fetched by said fetching, said program instructions being executable in a first operating mode and a second operating mode; and
switching between said first operating mode and said second operating mode in dependence upon a number of active threads of program instructions having program instructions fetched by said fetching and available to be executed; and
predicting branch instruction outcomes, wherein a first branch prediction mode corresponds to said first operating mode and a second branch prediction mode corresponds to said second operating mode, said first branch prediction mode consumes less power and provides less accurate branch predictions than said second branch prediction mode which consumes more power and provides more accurate branch predictions, wherein
said first operating mode has a lower average energy consumption per instruction executed than said second operating mode, said second operating mode has a higher average rate of instruction execution for a single thread than said first operating mode, and at least one portion of circuitry to execute said program instructions is disabled in one of said first operating mode and said second operating mode and enabled in a different one of said first operating mode and said second operating mode; and
said executing program instructions comprise executing out-of-order program instructions, said executing out-of-order processing program instructions corresponding to said second operating mode and said second branch prediction mode.

\* \* \* \* \*